United States Patent Office 3,555,036
Patented Jan. 12, 1971

3,555,036
CYCLOPROPYL-1,2,4-OXADIAZOLYLPYRIDINES
Victor John Bauer, Montvale, N.J., William Joseph Fanshawe, Pearl River, N.Y., and Sidney Robert Safir, River Edge, N.J., assignors to American Cyanamid Company, Stamford, Conn., a corporation of Maine
No Drawing. Continuation-in-part of application Ser. No. 676,706, Oct. 20, 1967. This application Nov. 10, 1969, Ser. No. 875,526
Int. Cl. C07d 31/42
U.S. Cl. 260—296  5 Claims

ABSTRACT OF THE DISCLOSURE

Cyclopropyl-1,2,4-oxadiazolylpyridines are described along with methods of preparing the same. These compounds are useful as intermediates in the preparation of quaternary cyclopropyl - 1,2,4 - oxadiazolylpyridinium salts, which are oral hypoglycemic agents. These compounds also show depressant properties evidenced by their ability to prevent convulsive seizures in animals caused by strychnine sulfate.

This application is a continuation-in-part of our application Ser. No. 676,706, filed Oct. 20, 1967, now abandoned.

PRIOR ART

Applicants are aware of British Pat. 875,887, directed to pyridinium salts. However, the present subject matter is not disclosed nor is the utility described therein.

SUMMARY OF THE INVENTION

This invention relates to new cyclopropyl-1,2,4-oxadiazolylpyridines which may be illustrated by the following formula:

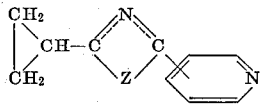

wherein Z is a trivalent radical selected from the group consisting of

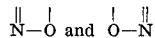

The dotted line represents one double bond, the position of which is dependent upon the definition of Z. When Z is

the double bond is between the N and carbon containing the cyclopropyl substituent, and when Z has the other meaning, the double bond is in the other position.

The compounds of the present invention may be prepared by reaction of cyclopropanecarboxylic anhydride and a pyridinecarboxamidoxime, or by reaction of cyclopropylcarboxamidoxime with a pyridinecarboxylic acid anhydride at elevated temperatures in the presence or absence of a solvent.

These reactions are illustrated schematically below:

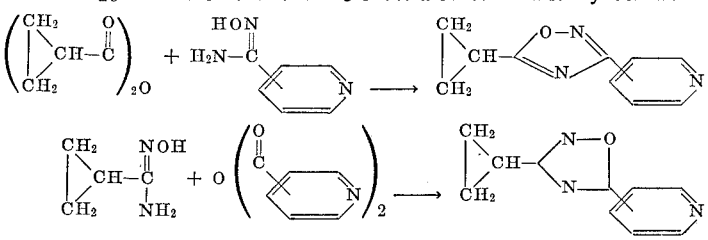

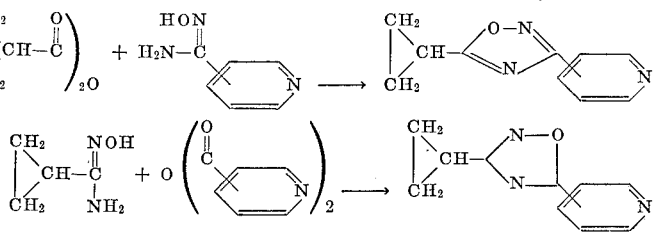

Compounds within the scope of the present invention are, for example, 2-(5-cyclopropyl)-1,2,4-oxadiazol-3-yl)pyridine,
2-(3-cyclopropyl-1,2,4-oxadiazol-5-yl)pyridine,
3-(5-cyclopropyl-1,2,4-oxadiazol-3-yl)pyridine,
3-(3-cyclopropyl-1,2,4-oxadiazol-5-yl)pyridine,
4-(5-cyclopropyl-1,2,4-oxadiazol-3-yl)pyridine, and
4-(3-cyclopropyl-1,2,4-oxadiazol-5-yl)pyridine.

The cyclopropyl-1,2,4-oxadiazolylpyridines of the present invention are useful as intermediates in the synthesis of quaternary cyclopropyl - 1,2,4 - oxadiazolylpyridinium compounds which are useful as oral hypoglycemic agents. Thus, a cyclopropyl - 1,2,4 - oxadiazolylpyridine is allowed to react with a lower alkyl halide to provide a 1-lower - (cyclopropyl - 1,2,4 - oxadiazolyl)-pyridinium halide. These reactions are illustrated by the formula:

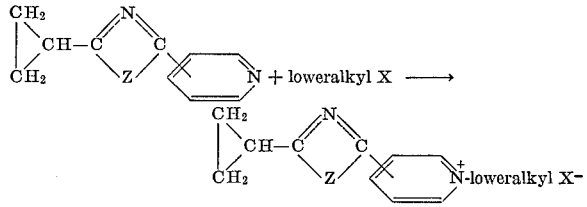

wherein Z is defined as above and X is halogen.

The compounds directly prepared from the intermediates of the present invention show hypoglycemic activity which indicates they are useful as medicaments in the lowering of blood sugar levels. When the compounds are administered orally to normal mice, a reduction of blood sugar levels is observed. Mice used in these studies are MF–1 (Manor Farms, 18–25 grams). The compounds are administered by gavage as saline solutions. Control animals receive an equivalent volume of vehicle. Food is withheld from animals after dosing. Blood glucose is determined 3 hours after dosing by the method of Hoffman [J. Biol. Chem., 120, 51 (1937)] as adapted to the Technicon AutoAnalyzer® and is expressed as percent change from saline controls. Blood samples are obtained from the tail veins of mice. The testing data is summarized in Table I.

TABLE I.—DECREASE BLOOD GLUCOSE IN NORMAL MICE AFTER ORAL ADMINISTRATION OF QUATERNARY CYCLOPROPYL-1,2,4-OXADIAZOLYL PYRIDINIUM SALTS

| Compound | Dose, mmoles/ kg. | Percent decrease in blood glucose |
|---|---|---|
| 1-methyl-4-(5-cyclopropyl-1,2,4-oxadiazol-3-yl)pyridinium chloride | 3.0 | 87±3 |
| 1-methyl-4-(3-cyclopropyl-1,2,4-oxadiazol-3-yl)pyridinium chloride | 3.0 | 29±4 |

In addition, the compounds of this invention show central nervous system depressant activity by protecting animals against convulsive seizures caused by strychnine. It has been reported [M. I. Gluckman, Pharmacology of oxazepam (Serax), a new antianxiety agent, Curr. Therap. Res., 1, 721 (1965)] that there is a high degree of correlation between anticonvulsant effects in animals and antianxiety effects in man. One measure of depressant activity is the ability to prevent convulsive seizures in warm-blooded animals, e.g., mice, caused by strychnine sulfate [H. M. Hanson and C. A. Stone, "Animal and Clinical Pharmacological Techniques in Drug Evaluation," vol. I, J. H. Nodine and P. E. Siegler, Eds., Yearbook Medical Publishers, Inc., Chicago, Ill., 1964, p. 317]. Graded dose levels of the compounds are administered intraperitoneally in a 2% aqueous starch medium to groups of ten mice at each dose. Strychnine sulfate, dissolved in aqueous saline is administered subcutaneously 30 minutes after drug treatment at doses estimated to cause toxic extensor seizures in 95% of the mice (0.82 milligram per kilogram of body weight). The median effective dose is calculated by the method of J. T. Litchfield and F. Wilcoxon [J. Pharmacol. Expt. Ther., 96, 99 (1949)]. The dose of 4-(5-cyclopropyl - 1,2,4 - oxadiazol-3-yl)pyridine which protects 50% of the mice from convulsive seizures caused by strychnine sulfate is 7 milligrams per kilogram intraperitoneally. Similarly effective are 30 milligrams per kilogram of 4-(3-cyclopropyl - 1,2,4 - oxadiazol-5-yl)pyridine, 10 milligrams per kilogram of 3-(5-cyclopropyl - 1,2,4 - oxadiazol-3-yl)pyridine, and 7 milligrams per kilogram of 2-(5-cyclopropyl - 1,2,4 - oxadiazol-3-yl)pyridine. These data demonstrate that the compounds of the present invention are useful in warm-blooded animals as muscle-relaxants and antianxiety agents.

DETAILED DESCRIPTION

The examples which follow described the preparation of the novel compounds of the present invention.

EXAMPLE 1

Preparation of 4-(5-cyclopropyl-1,2,4-oxadiazol-3-yl) pyridine

A mixture of 5.4 g. of isonicotinamidoxime and 19 g. of cyclopropanecarboxylic acid anhydride is heated at 170° C. for 2 hours. The mixture is diluted with chloroform and washed with water and aqueous sodium carbonate. The chloroform solution is dried over anhydrous magnesium sulfate and concentrated to a solid. Recrystallization from methanol-water gives tan crystals, melting point 78–82° C.

EXAMPLE 2

Preparation of 4-(3-cyclopropyl-1,2,4-oxadiazol-5-yl) pyridine

A mixture of 4.6 g. of isonicotinic acid anhydride and 2.0 g. of cyclopropanecarboxamidoxime is heated at 170° C. for 90 minutes. The mixture is washed with aqueous sodium carbonate solution. The undissolved solid is collected and recrystallized from hexane to give cream-colored crystals, melting point 92–93° C.

EXAMPLE 3

Preparation of 3-(5-cyclopropyl-1,2,4-oxadiazol-3-yl) pyridine

A mixture of 27.4 g. of nicotinamidoxime, 30.8 g. of cyclopropanecarboxylic acid anhydride, and 200 ml. of xylene is heated under reflux for 2 hours and concentrated to a yellow liquid. The liquid is suspended in aqueous sodium carbonate, and the mixture is extracted with chloroform. The chloroform solution is dried over anhydrous magnesium sulfate and concentrated to a liquid. Distillation gives a colorless liquid, boiling point 99–103° C. (0.25 mm.).

EXAMPLE 4

Preparation of 2-(5-cyclopropyl-1,2,4-oxadiazol-3-yl) pyridine

A mixture of 27.4 g. of picolinamidoxime, 30.8 g. of cyclopropanecarboxylic acid anhydride, and 200 ml. of xylene is heated under reflux for 2 hours and concentrated to a yellow liquid. The liquid is suspended in aqueous sodium carbonate, and the mixture is extracted with chloroform. The chloroform solution is dried over anhydrous magnesium sulfate and concentrated to a liquid. Distillation gives a colorless liquid, boiling point 130–140° C. (0.20 mm.).

EXAMPLE 5

Preparation of 1-methyl-4-(5-cyclopropyl-1,2,4-oxadiazol-3-yl)pyridinium chloride A mixture of 3.0 g. of 4-(5-cyclopropyl-1,2,4-oxadiazol-3-yl)pyridine and 10 ml. of methyl chloride is heated in a bomb at 90° C. for 20 hours. The excess methyl chloride is allowed to evaporate and the residue is recrystallized from acetonitrile to give off-white crystals, melting point 212–214° C.

EXAMPLE 6

Preparation of 1-methyl-4-(3-cyclopropyl-1,2,4-oxadiazol-5-yl)pyridinium chloride A mixture of 4.0 g. of 4-(3-cyclopropyl - 1,2,4 - oxadiazol-5-yl)pyridine and 10 ml. of methyl chloride is heated in a bomb at 90° C. for 20 hours. The excess methyl chloride is evaporated and the residue is recrystallized from acetonitrile to give white crystals, melting point 221–225° C.

We claim:
1. A cyclopropyl - 1,2,4 - oxadiazolylpyridine of the formula:

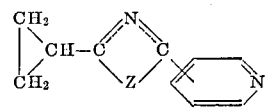

wherein Z is a trivalent radical selected from the group consisting of

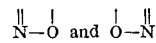

and the dotted line represents one double bond, the position being dependent upon the definition of Z.

2. The cyclopropyl - 1,2,4 - oxadiazolylpyridine according to claim 1: 4-(5-cyclopropyl - 1,2,4 - oxadiazol-5-yl)pyridine.

3. The cyclopropyl - 1,2,4 - oxadiazolylpyridine according to claim 1: 4-(3-cyclopropyl - 1,2,4 - oxadiazol-5-yl) pyridine.

4. The cyclopropyl - 1,2,4 - oxadiazolylpyridine according to claim 1: 3-(5-cyclopropyl - 1,2,4 - oxadiazol-3-yl) pyridine.

5. The cyclopropyl - 1,2,4 - oxadiazolylpyridine according to claim 1: 2-(5-cyclopropyl - 1,2,4 - oxadiazol-3-yl) pyridine.

References Cited

UNITED STATES PATENTS 2,733,245  1/1956  Ainsworth _____ 260—296

FOREIGN PATENTS 875,887  8/1961  Great Britain _____ 260—296

ALAN L. ROTMAN, Primary Examiner

U.S. Cl. X.R.

260—295, 999